United States Patent
Ozawa et al.

(10) Patent No.: US 11,167,638 B2
(45) Date of Patent: Nov. 9, 2021

(54) UTILITY VEHICLE

(71) Applicant: KAWASAKI JUKOGYO KABUSHIKI KAISHA, Kobe (JP)

(72) Inventors: Shouji Ozawa, Kakogawa (JP); Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 210 days.

(21) Appl. No.: 16/555,627

(22) Filed: Aug. 29, 2019

(65) Prior Publication Data

US 2021/0061096 A1    Mar. 4, 2021

(51) Int. Cl.
| | |
|---|---|
| *B60K 23/08* | (2006.01) |
| *B60K 23/02* | (2006.01) |
| *B60K 17/02* | (2006.01) |
| *B60K 17/30* | (2006.01) |
| *B60K 17/35* | (2006.01) |

(52) U.S. Cl.
CPC .......... *B60K 23/0808* (2013.01); *B60K 17/02* (2013.01); *B60K 17/30* (2013.01); *B60K 17/3505* (2013.01); *B60K 23/02* (2013.01); *B60K 2023/085* (2013.01)

(58) Field of Classification Search
CPC .... B60K 23/0808; B60K 23/02; B60K 17/02; B60K 17/30; B60K 17/3505; B60K 2023/085; B60K 23/04; B60K 2023/0866; B60K 2023/043; B60K 2023/0825; B60K 5/04; B60K 23/08; B60K 2005/003; B60Y 2400/424; B60Y 2200/20; B60Y 2200/124
See application file for complete search history.

(56) References Cited

U.S. PATENT DOCUMENTS

| | | | | |
|---|---|---|---|---|
| 4,681,180 | A * | 7/1987 | Oyama | B60K 23/04 180/248 |
| 5,105,901 | A * | 4/1992 | Watanabe | B60K 23/0808 180/245 |
| 8,613,336 | B2 | 12/2013 | Deckard et al. | |
| 10,668,808 | B2 * | 6/2020 | Nagayama | F16H 48/19 |
| 2008/0029328 | A1 * | 2/2008 | Hoeck | B60K 17/35 180/248 |
| 2014/0058643 | A1 * | 2/2014 | Kodama | B60K 23/08 701/82 |
| 2015/0111696 | A1 * | 4/2015 | Maeda | B60W 10/119 477/79 |
| 2018/0134154 | A1 * | 5/2018 | Shimizu | B60W 10/16 |

* cited by examiner

*Primary Examiner* — Justin Holmes
(74) *Attorney, Agent, or Firm* — Alleman Hall Creasman & Tuttle LLP

(57) ABSTRACT

A utility vehicle includes: a power unit that outputs drive power; a drive shaft that receives the drive power transmitted from the power unit; a front axle that receives the drive power transmitted from the drive shaft; a right front wheel connected to the front axle; a left front wheel connected to the front axle; a right clutch configured to disable power transmission from the drive shaft to the right front wheel; a left clutch configured to disable power transmission from the drive shaft to the left front wheel; a clutch actuator that actuates the left clutch and the right clutch; and a controller that controls the clutch actuator.

4 Claims, 5 Drawing Sheets

| COMMAND | LEFT CLUTCH | RIGHT CLUTCH |
|---|---|---|
| 2WD | DISENGAGED | DISENGAGED |
| 4WD | ENGAGED (POWER TRANSMISSION RATE: VARIABLE) | ENGAGED (POWER TRANSMISSION RATE: VARIABLE) |
| DIFFERENTIAL LOCKING | FULLY ENGAGED (POWER TRANSMISSION RATE: FIXED AT 100%) | FULLY ENGAGED (POWER TRANSMISSION RATE: FIXED AT 100%) |

UTILITY VEHICLE

BACKGROUND OF THE INVENTION

Field of the Invention

The present disclosure relates to a utility vehicle.

Description of the Related Art

U.S. Pat. No. 8,613,336 B2 discloses a utility vehicle configured to travel on uneven terrains. Such a utility vehicle generally includes a power unit mounted in a vehicle body of the vehicle, the power unit including an engine and a continuously variable transmission (CVT). Drive power is transmitted from the power unit to front and rear axles. The drive power transmitted from the power unit to the front axle is transmitted to a right front wheel and a left front wheel via a front differential. Between the power unit and the front differential is provided a clutch device for switching between two-wheel drive and four-wheel drive.

SUMMARY OF THE INVENTION

A utility vehicle according to an aspect of the present disclosure includes: a power unit that outputs drive power; a drive shaft that receives the drive power transmitted from the power unit; a front axle that receives the drive power transmitted from the drive shaft; a right front wheel connected to the front axle; a left front wheel connected to the front axle; a right clutch configured to disable power transmission from the drive shaft to the right front wheel; a left clutch configured to disable power transmission from the drive shaft to the left front wheel; a clutch actuator that actuates the left clutch and the right clutch; and a controller that controls the clutch actuator.

With the above configuration, control can be performed to bring the right clutch and the left clutch into different power transmission states. Thus, the function of a differential can be served by the right clutch and the left clutch, and the need for a differential can be eliminated.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

Figure 1:
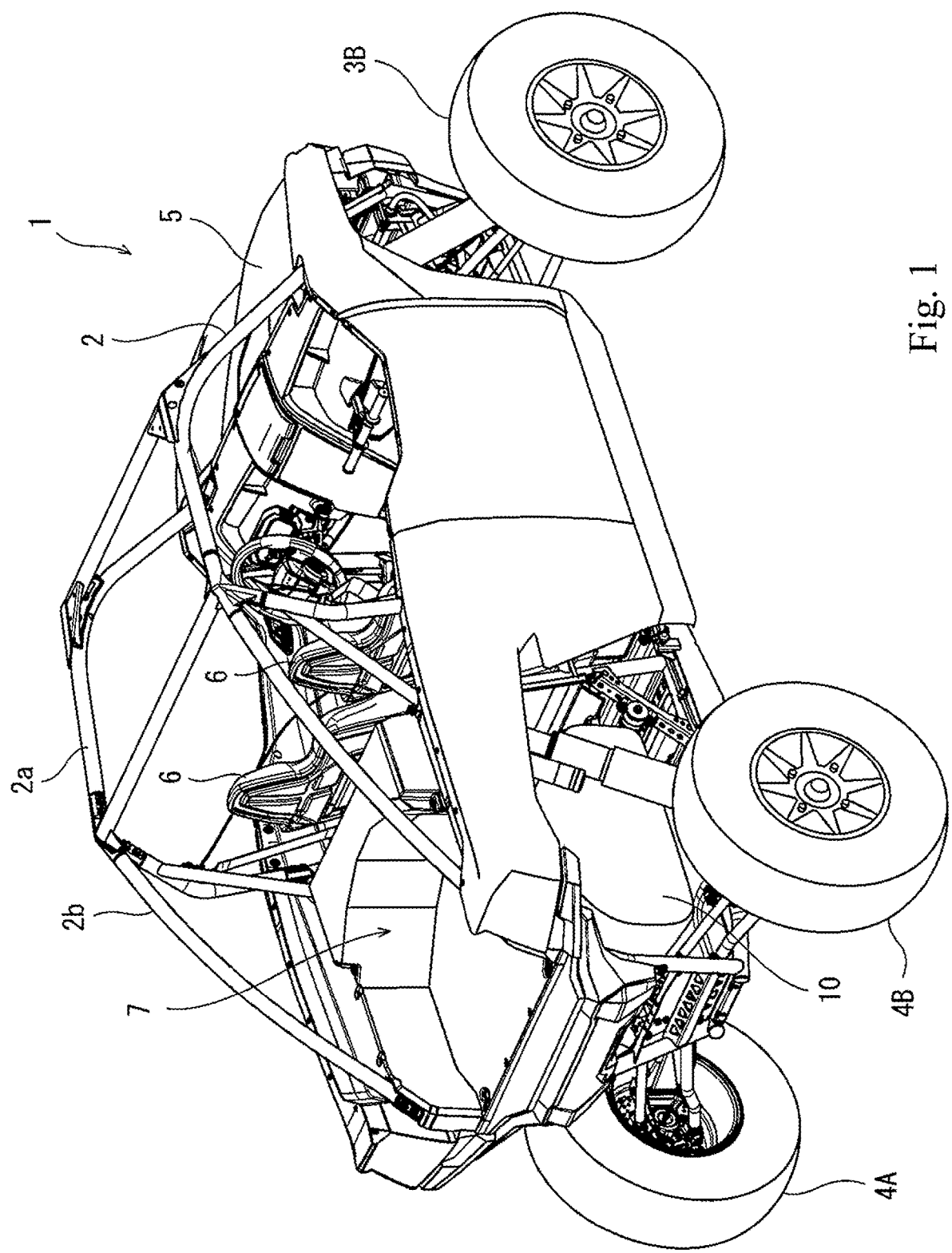
FIG. 1 is a perspective view of a utility vehicle according to an embodiment.
Figure 2:
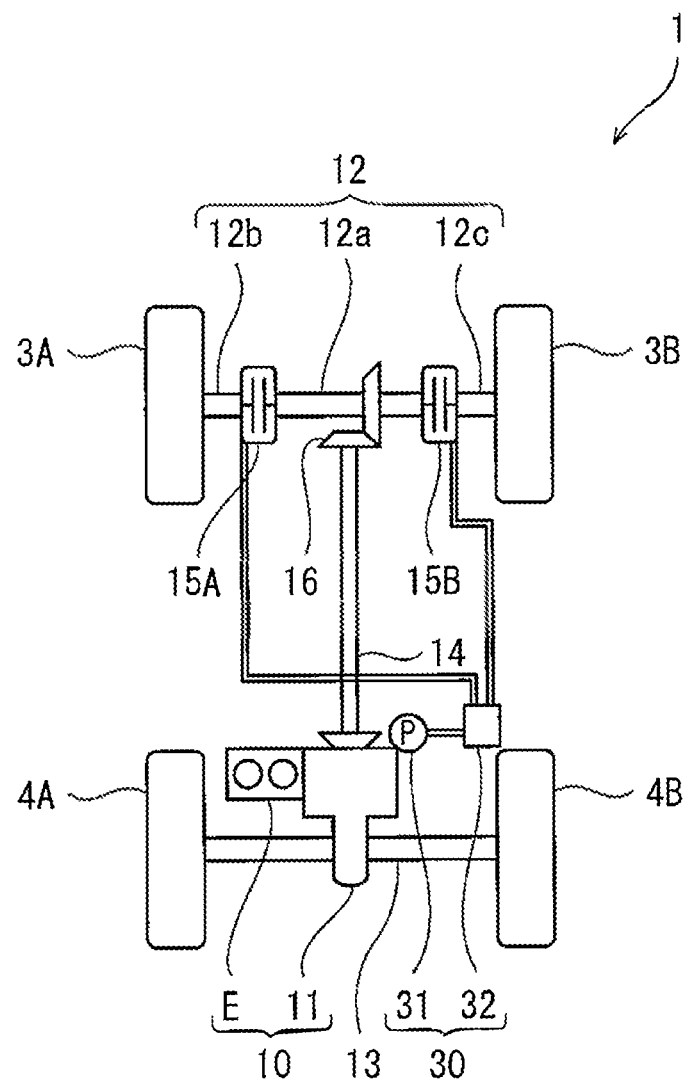
FIG. 2 is a plan view of a drive system of the utility vehicle shown in FIG. 1.

FIG. 1 is a perspective view of a utility vehicle 1 according to an embodiment. FIG. 2 is a plan view of a drive system of the utility vehicle 1 shown in FIG. 1. As shown in FIGS. 1 and 2, the utility vehicle 1 includes left and right front wheels 3A and 3B supported by a front portion of a vehicle body frame 2 and left and right rear wheels 4A and 4B supported by a rear portion of the vehicle body frame 2. The space between the left and right front wheels 3A and 3B is covered from above by a hood 5 made of resin. A pair of occupant seats 6 (driver seat and passenger seat) are disposed rearwardly of the hood 5 and located in the vicinity of the center of the vehicle body frame 2 in a forward/rearward direction.

The vehicle body frame 2 includes a cabin frame part 2a and a pair of left and right rear gusset frame parts 2b. The vehicle body frame 2 is a pipe frame constructed of a plurality of pipe members connected together. The cabin frame part 2a is formed to surround the occupant space in which the occupant seats 6 are disposed. The occupant space surrounded by the cabin frame part 2a is exposed to the outside of the vehicle. The rear gusset frame parts 2b connect an upper portion of the cabin frame part 2a to a rear portion of a rear frame part (not illustrated). A cargo carrier 7 forming a recessed cargo-carrying space is provided rearwardly of the occupant seats 6. Below the cargo carrier 7 is mounted a power unit 10 to be described later (the power unit 10 is omitted in FIG. 1).

As shown in FIG. 2, the left and right front wheels 3A and 3B are connected respectively to the ends of a front axle 12 extending in a leftward/rightward direction. The left and right rear wheels 4A and 4B are connected respectively to the ends of a rear axle 13 extending in the leftward/rightward direction. The power unit 10 includes, for example, an engine E and a transmission 11 that provides a rotational speed change of power generated by the engine E. The power unit 10 outputs drive power at a rotational speed resulting from the speed change provided by the transmission 11. The drive power output by the power unit 10 is transmitted to the rear axle 13 via a rear differential (not illustrated) and also to a drive shaft 14 extending forward to provide power transmission to the front axle 12.

On the front axle 12 there are mounted a left clutch 15A configured to disable power transmission from the drive shaft 14 to the left front wheel 3A and a right clutch 15B configured to disable power transmission from the drive shaft 14 to the right front wheel 3B. Specifically, the front axle 12 is divided into a central axle portion 12a, a left axle portion 12b, and a right axle portion 12c. The left axle portion 12b is connected to the left front wheel 3A to provide power transmission to the left front wheel 3A, and the right axle portion 12c is connected to the right front wheel 3B to provide power transmission to the right front wheel 3B. The central axle portion 12a is located between the left axle portion 12b and the right axle portion 12c. The drive shaft 14 is connected to the central axle portion 12a via a bevel gear 16 to provide power transmission to the central axle portion 12a.

The left clutch 15A is interposed between the central axle portion 12a and the left axle portion 12b. The right clutch 15B is interposed between the central axle portion 12a and the right axle portion 12c. When the left clutch 15A is in a disengaged state, the rotational power transmitted from the drive shaft 14 to the central axle portion 12a is not transmitted to the left axle portion 12b. When the right clutch 15B is in a disengaged state, the rotational power transmitted from the drive shaft 14 to the central axle portion 12a is not transmitted to the right axle portion 12c. In the present embodiment, the left and right clutches 15A and 15B are clutches (e.g., multi-plate clutches) configured to continuously vary the power transmission rates thereof.

The left and right clutches 15A and 15B are individually actuated by power delivered from a clutch actuator 30. For example, the left and right clutches 15A and 15B are hydraulic clutches actuated by hydraulic pressure, and the clutch actuator 30 is a hydraulic actuator. Specifically, the clutch actuator 30 includes a hydraulic pump 31 and a control valve unit 32. The hydraulic pump 31 is driven by the engine E. The control valve unit 32 is controllable between a state in which the control valve unit 32 allows hydraulic pressure of the hydraulic pump 31 to be applied to the left and right clutches 15A and 15B and a state in which the control valve unit 32 blocks hydraulic pressure of the hydraulic pump 31 from being applied to the left and right clutches 15A and 15B. The control valve unit 32 is configured to continuously vary the pressure to be applied to the left and right clutches 15A and 15B from the hydraulic pump 31.

Figure 3:
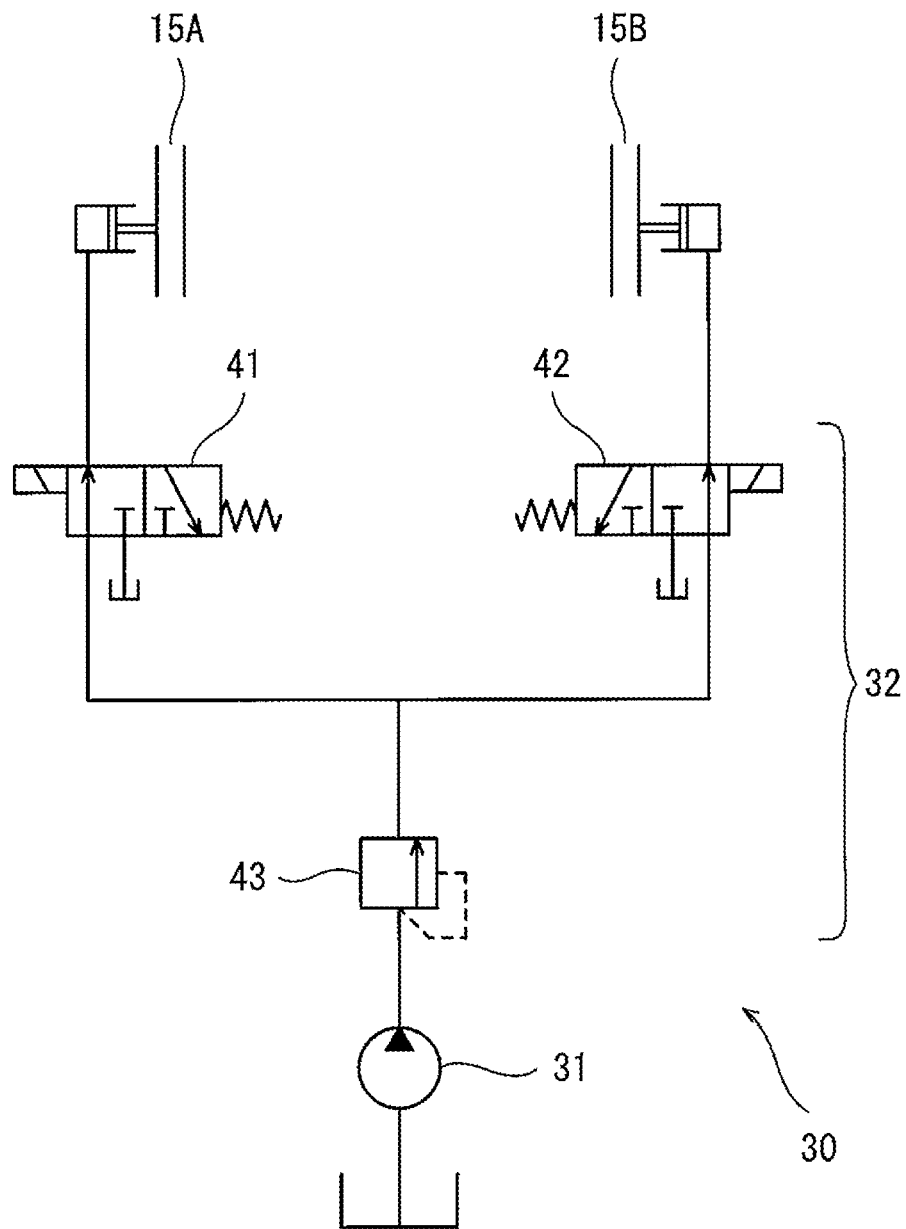
FIG. 3 is a hydraulic circuit diagram illustrating an example of a clutch actuator shown in FIG. 2.

FIG. 3 is a hydraulic circuit diagram illustrating an example of the clutch actuator 30 shown in FIG. 2. As shown in FIG. 3, the clutch actuator 30 includes a first electromagnetically controlled valve 41, a second electromagnetically controlled valve 42, and a relief valve 43. The first electromagnetically controlled valve 41 is configured to control hydraulic pressure applied to the left clutch 15A from the hydraulic pump 31. The second electromagnetically controlled valve 42 is configured to control hydraulic pressure applied to the right clutch 15B from the hydraulic pump 31. The relief valve 43 is configured to prevent a situation where hydraulic pressure delivered to the first and second electromagnetically controlled valves 41 and 42 from the hydraulic pump 31 exceeds a predetermined pressure.

The details of the configuration of the second electromagnetically controlled valve 42 are the same as those of the first electromagnetically controlled valve 41, and therefore the first electromagnetically controlled valve 41 will now be described as a representative. The first electromagnetically controlled valve 41 can be controlled to vary the opening degree of a flow passage from the hydraulic pump 31 to the left clutch 15A and adjust the pressure applied to the left clutch 15A, thereby continuously varying the power transmission rate of the left clutch 15A. In the state where the control valve unit blocks hydraulic pressure of the hydraulic pump 31 from being applied to the left clutch 15A, the first electromagnetically controlled valve 41 causes a port for actuation of the left clutch 15A to communicate with a drain passage. In this state, the left clutch 15A is kept disengaged by a biasing force of a spring (not illustrated).

Figure 4:
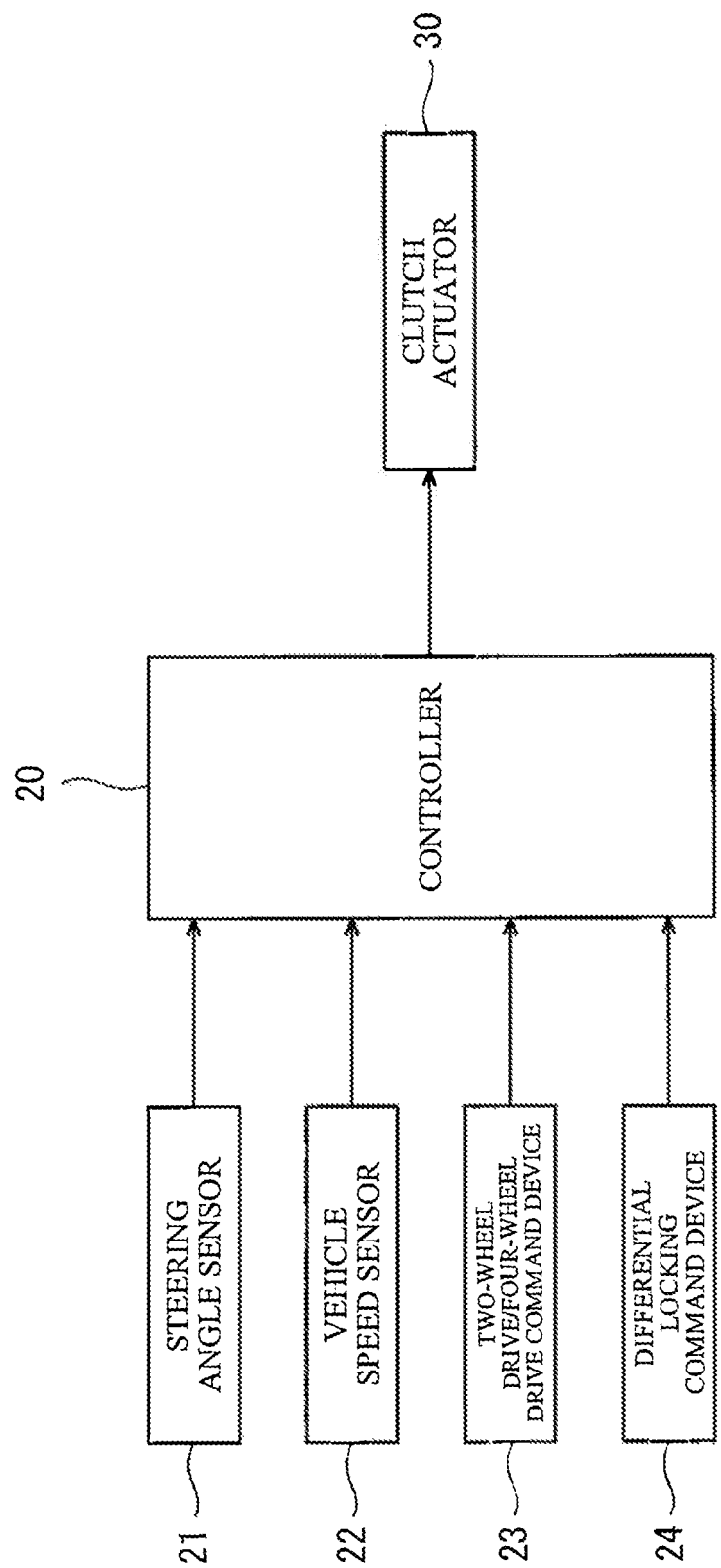
FIG. 4 is a block diagram of a control system of the utility vehicle shown in FIG. 2.

FIG. 4 is a block diagram of a control system of the utility vehicle 1 shown in FIG. 2. As shown in FIG. 4, the utility vehicle 1 includes a controller 20. The utility vehicle 1 includes a steering angle sensor 21, a vehicle speed sensor 22, a two-wheel drive/four-wheel drive command device 23, and a differential locking command device 24, which are provided on the input side of the controller 20.

The steering angle sensor 21 detects the steering angles of the left and right front wheels 3A and 3B. That is, the steering angle sensor 21 is an example of a turning degree detector configured to detect the turning degrees of the left and right front wheels 3A and 3B. The detector is not limited to the steering angle sensor 21 and may be any device capable of turning degree detection. For example, a combination of a vehicle speed sensor and a lateral acceleration sensor may be used. That is, a detection system may be employed which determines that the steering angle is large when the vehicle speed is low and the lateral acceleration is high and which determines that the steering angle is small when the vehicle speed is high and the lateral acceleration is low. The vehicle speed sensor 22 is a sensor that detects the travel speed of the utility vehicle 1.

The two-wheel drive/four-wheel drive command device 23 is an input device that informs the controller 20 which of the two-wheel drive mode and four-wheel drive mode has been selected by the driver. When it is automatically determined whether to switch between the two-wheel drive mode and the four-wheel drive mode, the two-wheel drive/four-wheel drive command device 23 may be provided as a command section included in the controller to generate control commands.

The differential locking command device 24 is an input device that informs the controller 20 whether the driver intends to bring the left and front wheels 3A and 3B into a synchronized state in which the wheels 3A and 3B are synchronized (a state in which the wheels 3A and 3B run at the same rotational speed). When it is automatically determined whether to bring the left and right front wheels 3A and 3B into the synchronized state, the differential locking command device 24 may be provided as a command section included in the controller to generate control commands.

The utility vehicle 1 includes the clutch actuator 30 provided on the output side of the controller 20. The clutch actuator 30 generates power for actuating the left and right clutches 15A and 15B individually. For example, the left and right clutches 15A and 15B may be clutches actuated by hydraulic pressure, and the clutch actuator 30 may be configured to include a hydraulic pump and hydraulic piping system that enable application of hydraulic pressure to the left and right clutches 15A and 15B. The controller 20 controls the clutch actuator 30 (e.g., the electromagnetically controlled valves 41 and 42) in response to inputs from the steering angle sensor 21, vehicle speed sensor 22, two-wheel drive/four-wheel drive command device 23, and differential locking command device 24.

Figures 5, 6:
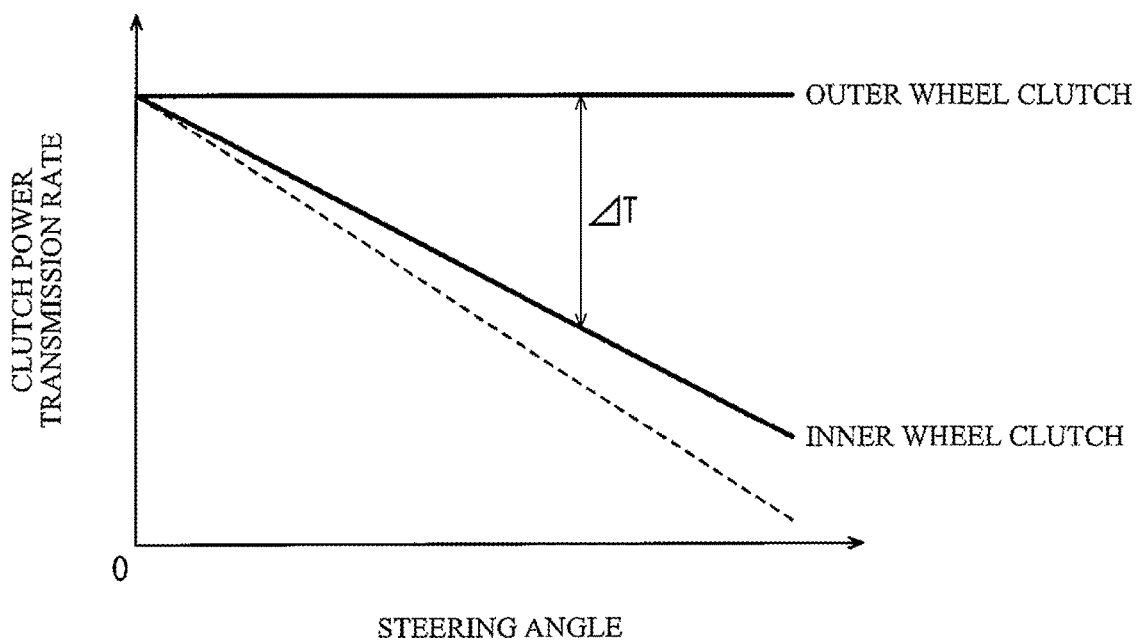
FIG. 5 is a table illustrating clutch control performed by a controller shown in FIG. 4.
FIG. 6 is a graph showing the relationship between steering angle and clutch power transmission rate in the clutch control performed by the controller shown in FIG. 4.

FIG. 5 is a table illustrating clutch control performed by the controller 20 shown in FIG. 4. As seen from FIGS. 2 to 4, the controller 20 controls the clutch actuator 30 to bring the left and right clutches 15A and 15B into a disengaged state upon receiving a two-wheel drive command from the two-wheel drive/four-wheel drive command device 23. Upon receiving a four-wheel drive command from the two-wheel drive/four-wheel drive command device 23, the controller 20 controls the clutch actuator 30 to bring the left and right clutches 15A and 15B into an engaged state.

In the four-wheel drive state, the controller 20 controls the clutch actuator 30 to cause the power transmission rates of the left and right clutches 15A and 15B to vary as a function of the steering angles detected by the steering angle sensor 21. Upon receiving from the differential locking command device 24 the command to bring the left and right front wheels 3A and 3B into the synchronized state, the controller 20 controls the clutch actuator 30 to keep (fix) both of the left and right clutches 15A and 15B in a fully engaged state.

FIG. 6 is a graph showing the relationship between steering angle and clutch power transmission rate in the clutch control performed by the controller 20 shown in FIG. 4. During straight travel in the four-wheel drive state, as seen from FIG. 6, the controller 20 keeps (fixes) both of the left and right clutches 15A and 15B in a fully engaged state. During turning, the controller 20 controls the clutch actuator 30 to make the power transmission rate of the right clutch 15B and the power transmission rate of the left clutch 15A different from each other.

For detailed explanation, one of the left and right clutches 15A and 15B that is associated with the outer wheel during turning is defined as an outer wheel clutch, and the other clutch associated with the inner wheel during turning is defined as an inner wheel clutch. The controller 20 controls the clutch actuator 30 to cause the power transmission rate of the inner wheel clutch to decrease with increasing steering angle. For example, during clockwise turning, the controller 20 controls the clutch actuator 30 to cause the power transmission rate of the right clutch 15B to decrease with increasing steering angle, while during counterclockwise turning, the controller 20 controls the clutch actuator 30 to cause the power transmission rate of the left clutch 15A to decrease with increasing steering angle.

During turning, the controller 20 controls the clutch actuator 30 to cause a difference ΔT to increase with increasing vehicle speed, the difference ΔT being a value determined by subtracting the power transmission rate of the inner wheel clutch from the power transmission rate of the outer wheel clutch. For example, as the vehicle speed increases during turning, the controller 20 makes a correction by increasing the amount of decrease in the power transmission rate of the inner wheel clutch per unit increase of the steering angle (i.e., by increasing the slope of decrease in the power transmission rate of the inner wheel clutch; see the dashed line in FIG. 6).

With the configuration described above, control is performed to bring the left and right clutches 15A and 15B into different power transmission states in the four-wheel drive mode. Thus, the function of a differential can be served by the left and right clutches 15A and 15B, and the need for a differential can be eliminated. Additionally, since the power transmission rates of the left and right clutches 15A and 15B are varied as a function of the steering angles during turning and in particular since the power transmission rate of the inner wheel clutch decreases with increasing steering angle, smooth turning maneuver can be achieved.

Additionally, since the difference ΔT, which is a value determined by subtracting the power transmission rate of the inner wheel clutch from the power transmission rate of the outer wheel clutch, increases with increasing vehicle speed during turning, the occurrence of understeer upon increase of the vehicle speed can be reduced. Further, since the left and right clutches 15A and 15B are multi-plate clutches, the power transmission rates of the left and right clutches 15A and 15B can be continuously varied using a simple configuration. Further, since the clutch actuator 30 actuates the left and right clutches 15A and 15B by hydraulic pressure, stable clutch operation can be achieved.

Upon issuance of a two-wheel drive command from the two-wheel drive/four-wheel drive command device 23, the left and right clutches 15A and 15B are brought into a disengaged state, while upon issuance of a four-wheel drive command from the two-wheel drive/four-wheel drive command device 23, the left and right clutches 15A and 15B are brought into an engaged state. This allows easy switching between the two-wheel drive mode and the four-wheel drive mode. That is, the function of a differential and the two-wheel drive/four-wheel drive switching function can be achieved with a simple configuration. An additional clutch dedicated for two-wheel drive/four-wheel drive switching may be provided separately from the left and right clutches 15A and 15B.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A utility vehicle comprising:
a power unit that outputs drive power;
a drive shaft that receives the drive power transmitted from the power unit;
a front axle that receives the drive power transmitted from the drive shaft;
a right front wheel connected to the front axle;
a left front wheel connected to the front axle;
a right clutch configured to disable power transmission from the drive shaft to the right front wheel;
a left clutch configured to disable power transmission from the drive shaft to the left front wheel;
a clutch actuator that actuates the left clutch and the right clutch;
a controller that controls the clutch actuator; and
a turning degree detector configured to detect turning degrees of the right front wheel and the left front wheel, wherein
the left clutch and the right clutch are clutches configured to continuously vary power transmission rates thereof,
when one of the left and right clutches that is associated with an outer wheel during turning is defined as an outer wheel clutch and the other clutch associated with an inner wheel during turning is defined as an inner wheel clutch,
the controller is configured to control:
the clutch actuator to cause the power transmission rates of the left clutch and the right clutch to vary as a function of the turning degrees detected by the turning degree detector,
the clutch actuator during clockwise turning to cause the power transmission rate of the right clutch to decrease with increasing turning degree,
the clutch actuator during counterclockwise turning to cause the power transmission rate of the left clutch to decrease with increasing turning degree, and
the clutch actuator during turning to cause a difference to increase with increasing vehicle speed, the difference being a value determined by subtracting the power transmission rate of the inner wheel clutch from the power transmission rate of the outer wheel clutch.

2. The utility vehicle according to claim 1, wherein the left clutch and the right clutch are multi-plate clutches.

3. The utility vehicle according to claim 1, wherein
the right clutch and the left clutch are clutches actuated by hydraulic pressure, and
the clutch actuator comprises a hydraulic pump and a control valve unit configured to allow hydraulic pressure of the hydraulic pump to be applied to the left clutch and the right clutch.

4. The utility vehicle according to claim 1, wherein
upon receiving a predetermined two-wheel drive command, the controller controls the clutch actuator to bring the left clutch and the right clutch into a disengaged state, and
upon receiving a predetermined four-wheel drive command, the controller controls the clutch actuator to bring the left clutch and the right clutch into an engaged state.

* * * * *